United States Patent
Tiyyagura (10) Patent No.: US 8,010,544 B2
(45) Date of Patent: Aug. 30, 2011

(54) INVERTED INDICES IN INFORMATION EXTRACTION TO IMPROVE RECORDS EXTRACTED PER ANNOTATION

(75) Inventor: Mahesh Tiyyagura, Karnataka (IN)

(73) Assignee: Yahoo! Inc., Sunnyvale, CA (US)

(*) Notice: Subject to any disclaimer, the term of this patent is extended or adjusted under 35 U.S.C. 154(b) by 560 days.

(21) Appl. No.: 12/135,070

(22) Filed: Jun. 6, 2008

(65) Prior Publication Data

US 2009/0307256 A1 Dec. 10, 2009

(51) Int. Cl.
*G06F 17/30* (2006.01)
(52) U.S. Cl. .......................... 707/758; 707/803
(58) Field of Classification Search .................. None
See application file for complete search history.

(56) References Cited

U.S. PATENT DOCUMENTS

| | | | |
|---|---|---|---|
| 6,233,575 B1* | 5/2001 | Agrawal et al. ................ | 1/1 |
| 7,401,071 B2* | 7/2008 | Hattori et al. .................. | 1/1 |
| 7,478,100 B2* | 1/2009 | Murthy et al. .................. | 1/1 |
| 7,657,555 B2* | 2/2010 | Rorex et al. ............ | 707/999.102 |
| 7,721,192 B2* | 5/2010 | Milic-Frayling et al. ..... | 715/230 |
| 7,765,236 B2* | 7/2010 | Zhai et al. .................... | 707/797 |
| 7,783,642 B1* | 8/2010 | Feng et al. .................... | 707/739 |
| 7,917,480 B2* | 3/2011 | Dean et al. .................... | 707/693 |
| 2005/0055334 A1* | 3/2005 | Krishnamurthy ............... | 707/2 |
| 2008/0098300 A1* | 4/2008 | Corrales et al. ............... | 715/243 |

OTHER PUBLICATIONS

Vydiswaran, V.G. Vinod, et al., U.S. Appl. No. 11/938,736, filed Nov. 12, 2207, entitled "Extracting Information Based on Document Structure and Characteristics of Attributes," not yet published.

Chitrapura, Krishna, et al., U.S. Appl. No. 11/838,351, filed Aug. 14, 2007, entitled "Method for Organizing Structurally Similar Web Pages from a Web Site," not yet published.

Le Hégaret, Philippe, et al., "What is the Document Object Model?," http://www.w3.org/TR/DOM-Level-2-Core/introduction.html, dated Nov. 13, 2000.

Kushmerick, Nicholas, et al., "Wrapper Induction for Information Extraction," Intl. Joint Conference on Artificial Intelligence (IJCAI) 1997.

Hong, Mingcai, et al., "Semantic Annotation using Horizontal and Vertical Contexts," First Asian Semantic Web Conference, Beijing, China, Sep. 3-7, 2006, pp. 58-64.

Mukherjee, Saikat, et al., "Automatic Discovery of Semantic Structures in HTML Documents," Proceedings of the Seventh International Conference on Document Analysis and Recognition 2003.

(Continued)

*Primary Examiner* — Kuen S Lu
*Assistant Examiner* — Michelle Owyang
(74) *Attorney, Agent, or Firm* — Hickman Palermo Truong & Becker LLP (57) ABSTRACT

A method is provided for information extraction from among a multiplicity of documents each having a corresponding document object model (DOM) comprising: computing signatures associated with nodes of a multiplicity of DOMs corresponding to the multiplicity of documents; producing an index that associates computed signatures to each document that has a DOM that has one or more nodes corresponding to such signature; annotating one or more nodes of a DOM that corresponds to the at least one selected document; wherein the one or more annotated nodes respectively correspond to one or more respective signatures included in the index; and matching the signatures that correspond to the annotated nodes with signatures in the index to determine which documents from the multiplicity of documents have one or more DOM nodes that correspond to one or more of the annotated nodes.

20 Claims, 7 Drawing Sheets

OTHER PUBLICATIONS

Reeve, Lawrence, et al., "Survey of Semantic Annotation Platforms," 20th Annual ACM Symposium on Applied Computing, Santa Fe, New Mexico, Mar. 13 -17, 2005.

Lin, QingFeng, et al., A Machine Learning Framework for Automatically Annotating Web Pages with Simple HTML Ontology Extension (SHOE), International Conference on Intelligent Agents, Web Technologies and Internet Commerce (IAWTIC), Las Vegas, Nevada, 2001.

Senellart, P., et al., "Using domain Knowledge to Extract Wrappers for Tree-Structured Documents," Ranked XML Querying Dagstuhl Seminar, Wadern, Germany, Mar. 13, 2008.

* cited by examiner

```html
<html>
<body>
<table class=ads/>
<table class=info>
<tr>
<td width="40%"/>

<td width="60%">
<img width="100px" src="yahoo.jpg"/>
</td>
</tr>
<tr>
<td class="cost">
$34.00
</td>
<td/>
</tr>
</table>
</body>
</html>
```

INVERTED INDICES IN INFORMATION EXTRACTION TO IMPROVE RECORDS EXTRACTED PER ANNOTATION

BACKGROUND OF THE INVENTION

1. Field of the Invention:

The invention relates in general to the World Wide Web, and more particularly, to information extraction from web pages.

2. Brief Description of the Related Art:

World Wide Web

The Internet is a worldwide system of computer networks and is a public, self-sustaining facility that is accessible to tens of millions of people worldwide. The most widely used part of the Internet is the World Wide Web, often abbreviated "WWW" or simply referred to as just "the web". The web is an Internet service that organizes information through the use of hypermedia. The HyperText Markup Language ("HTML") is typically used to specify the contents and format of a hypermedia document (e.g., a web page).

In this context, an HTML file is a file that contains source code for a particular web page. Typically, an HTML document includes one or more pre-defined HTML tags and their properties, and text or references to other information enclosed between the tags. A web page comprises the image or collection of images that is displayed to a user when a particular HTML file is rendered by a browser application program. The type of HTML tags and their location within the HTML file determine the structure of the document and direct the browser in rendering the web page. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The HyperText Transfer Protocol ("HTTP") is the protocol used to access a web document and the references that are based on HTTP are referred to as hyperlinks (formerly, "hypertext links").

Search Engines

Through the use of the web, individuals have access to millions of pages of information. However a significant drawback with using the web is that because there is so little organization to the web, at times it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Second, each search engine contains information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, and provides an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

Semi-Structured Web Pages to Present a Uniform View of Similar Information

The Internet today has an abundance of data presented in web pages. Many online merchants present their goods and services through web pages that have a relatively uniform appearance or 'look-and-feel'. These merchants in effect employ uniform templates in the display of web pages in order to foster familiarity and ease of interaction with the abundance of different web pages presented by these merchants. A uniform appearance often is achieved through use of scripts that produce web pages that conform to some uniform semi-structured format that results in presentation of important information at strategic positions in the page. For example, a merchant may strive to present similar information in similar positions on different web pages. Identifying such positions on a page and extracting and indexing relevant information is important to the success of data-centric application like search.

With the advent of e-commerce, most web pages are now dynamic in their content. Typical examples are products sold at discounted price that keep changing on sites between Thanksgiving and Christmas every year, or hotel rooms that change their room fares on a seasonal basis. With advertisement and user services critical for business success, it is imperative that crawled content be updated on frequent and near real-time basis.

These examples show that on the Web, especially on large sites, web pages are often generated dynamically through scripts that place the data elements from a database in appropriate positions using a defined template. By understanding these templates, one can more readily identify and extract the more useful information on the pages.

Information Extraction Systems

Information Extraction (IE) systems are used to gather and manipulate the unstructured and semi-structured information on the web and populate backend databases with structured records. Most IE systems are either rule based (i.e., heuristic based) extraction systems or automated extraction systems. In a website with a reasonable number of pages, information (e.g., products, jobs, etc.) is typically stored in a backend database and is accessed by a set of scripts for presentation of the information to the user.

IE systems commonly use extraction templates to facilitate the extraction of desired information from a group of web pages such as the web pages provided by a given online merchant. Generally, an extraction template is based on the general layout of the group of pages for which the corresponding extraction template is defined. One technique used for generating extraction templates is referred to as "template induction", which automatically constructs templates (i.e., customized procedures for information extraction) from labeled examples of a page's content.

In some IE systems involving template induction, clusters of structurally similar web pages are identified, and individual persons annotate a few sample web pages from each cluster to indicate subjects of interest. For example, the desired information from web pages within a cluster may be 'title', 'image' and 'price'. A person tasked with annotating sample pages from the cluster might view a sample web page and select fields or regions visible within the sample web page and label them (i.e., annotate them) as title, image or price, as appropriate. The annotations are associated automatically with structural nodes within a schema, such as the DOM (document object model) corresponding to the web page. The annotations are used to extract 'title', 'image' and 'price' data associated with structural nodes of other pages that correspond to the annotated nodes of the sample page. For more information on template induction, see for example, commonly assigned U.S. patent application Ser. No. 11/938,736, entitled Extracting Information Based on Document Structure and Characteristics of Attributes, filed Nov. 12, 2007, invented by V.G. Vinod Vydiswaran, et al., which is expressly incorporated herein by this reference.

While prior IE techniques generally have been acceptable, there have been shortcomings with their use. For example, in the past, relatively insignificant difference in the content of web pages often could result in their be allocated into different clusters. The resulting increased number of clusters in turn, resulted in an increase in the number of web pages to be annotated. For example, two web pages may be similar in appearance, except that one may include discount price information while the other does not, or one may include an advertisement while the other does not. Despite overall similarity of appearance and content of the two, such web pages often would be allocated to different clusters, and sample web pages from each cluster would be annotated by individual persons. The larger the number of clusters, the greater the number of web pages to be annotated. In view of the large number of web pages from which information is extracted, there is a need for more efficient approaches to web page annotation. The present invention meets this need.

SUMMARY OF THE INVENTION

A method is provided for information extraction from among a multiplicity of documents each having a corresponding document object model (DOM). Signatures are computed for DOM nodes of at least some of the multiplicity of documents. An index is produced that associates each one of multiple computed signatures to an identifier of each document that has a DOM that has one or more nodes corresponding to such signature. One or more nodes of a DOM that corresponds to a selected document is annotated. The annotated nodes correspond to one or more signatures included in the index. Signatures that correspond to the annotated nodes are matched with signatures in the index to determine which documents correspond to annotated nodes.

The index of signatures to document identifiers is used to match signatures of annotated DOM nodes to documents identified in the index. Documents having similarly structured DOMs present similar information in a similar way. Likewise, similarly structured nodes of DOMs of different documents are likely to correspond to regions of the different documents that present similar information. The index advantageously uses signatures corresponding to annotated DOM nodes to identify documents likely to include information to be extracted.

These and other aspects and advantages of the invention will be apparent to persons skilled in the art through the following detailed description of embodiments thereof in conjunction with the drawings.

DETAILED DESCRIPTION OF THE PREFERRED EMBODIMENTS

The following description is presented to enable any person skilled in the art to make and use a system and method to annotate structured documents such as pages documents, and to extract information using such annotations in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Document Object Model (DOM)

A Document Object Model (DOM) models a document in terms of objects. A DOM serves as an application programming interface (API) for valid HTML and well-formed XML documents. An API is an application programming interface, a set of functions or methods used to access some functionality. The DOM defines the logical structure of a document and the how the document is accessed and manipulated. The term "document" is used here in a broader sense. Increasingly, XML is being used to represent many different kinds of information that may be stored in diverse systems, and much of this would traditionally be viewed as data rather than as documents. Nevertheless, XML presents this data as documents, and the DOM may be used to manage this data.

With the Document Object Model, programmers can build documents, navigate their structure, and add, modify, or delete elements and content. The DOM is based on an object structure that closely resembles the structure of the documents that it models. One property of DOM structure models is structural isomorphism: if any two Document Object Model implementations are used to create a representation of the same document, they will create the same structure model. A Document Object Model is an "object model" in the object oriented design sense. An object model comprises a collection of descriptions of classes or interfaces, together with their member data, member functions, and class-static operations. A DOM models documents using objects, and the model encompasses not only the structure of a document, but also the behavior of a document and the objects of which it is composed. Thus, the nodes of a DOM do not represent a data structure. Rather, they represent software objects. As an object model, the DOM identifies: the interfaces and objects used to represent and manipulate a document; the semantics of these interfaces and objects—including both behavior and attributes; and relationships and collaborations among these interfaces and objects. See, P. Le Hegaret, L. Wood and J. Robie, "What is the Document Object Model?" 7 Nov. 13, 2000.

An XML DOM presents an XML document as a hierarchical tree-structure referred to as a node-tree. A node tree comprises a set of nodes and connections between them. The tree includes a root node and branches out to text nodes at the lowest level of the tree. The nodes in a node tree have a hierarchical relationship to each other. The terms parent, child, and sibling are used to describe hierarchical relationships among nodes in a node tree. Parent nodes have children. The root node is the 'top' node of the tree. Every node, except the root, has exactly one parent node. A node can have any number of children. A leaf is a node with no children. Siblings nodes are nodes with the same parent.

Figure 1A:
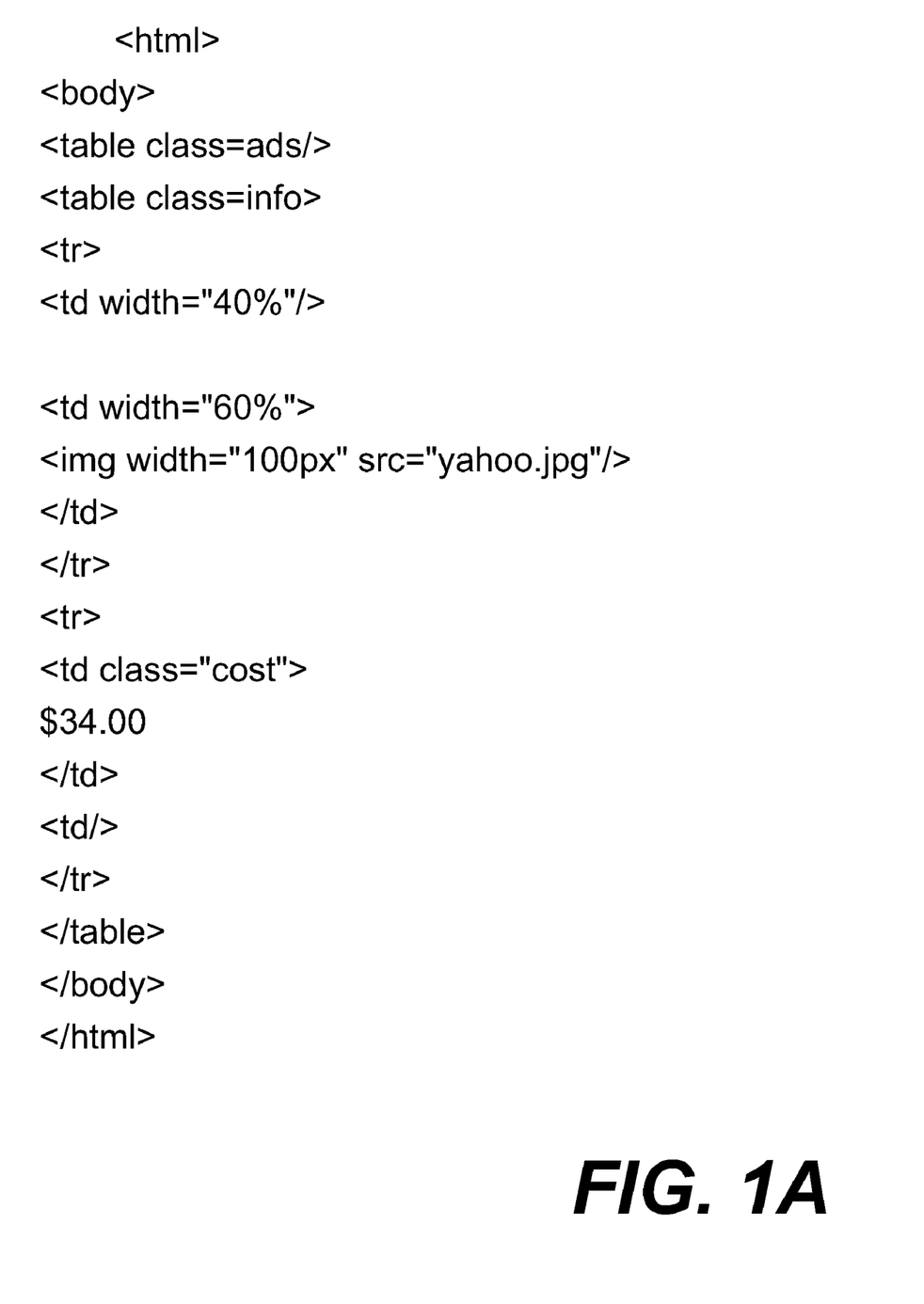
FIG. 1A-B shows sample HTML code (FIG. 1A) an illustrative drawing of an example DOM (FIG. 1B) for the example HTML code.
Figure 1B:
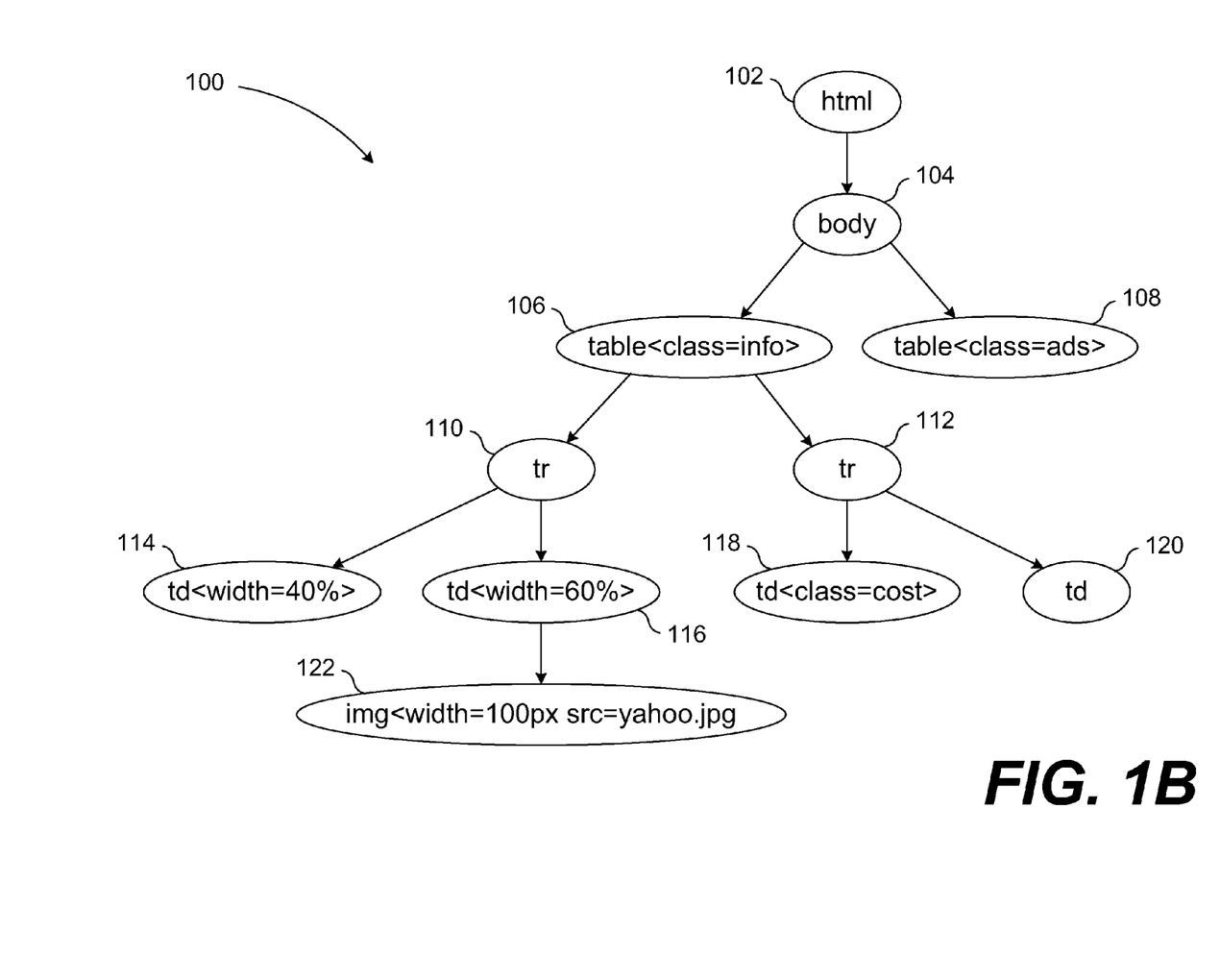

FIG. 1A shows sample HTML code, and FIG. 1B is an illustrative drawing of an example DOM 100 for the example HTML code of FIG. 1A.

The DOM 100 includes a root node 102 labeled "html". The root node 102 has a child node 104 labeled "body". The body node 104 has two child nodes 106, 108 that are sibling nodes labeled "table<class=info>" and "table<class=ads>" respectively. The "table<class=info>" node 106 has two child nodes 110, 112 that are siblings, both labeled "tr". The tr node 110 has two child nodes that are siblings labeled "td<width=40%>." and "td<width=60%>", respectively. The tr node 112 has two child nodes 118, 120 that are siblings labeled "td<class=cost>" and "td" respectively. The td<width=60%>node 116 has a single child node 122.

Referring to nodes, 106, 110, 112 and 120, in the HTML language, a "table" node may have "tr" nodes as children to create a new row in the table, and "tr" nodes may have "td" nodes as children to create a new column in the row. It will be understood that additional nodes (not shown) may be included as child nodes to node 108 or node 120, for example. Thus, the entire DOM 100 can be quite a large and complex structure.

Computation of Signatures for DOM Nodes

A signature for a given node is indicative of a path within the DOM that includes the node. Specifically, a signature for a given node is computed as a hash of the path through the DOM tree from a root node to the given node. Consistent with the isomorphism property of DOMs, identical signatures are computed for nodes associated with identical path structures. Thus, signatures associated with individual nodes are indicative of the structure of corresponding paths associated with such nodes.

For example, referring to the DOM 100 of FIG. 1, the td<class=cost>node 118 is associated with, path=html/body/table[class]/tr/td[class], and a signature for the td<class=cost>node 118 node can be computed as, signature=hash("html/body/table[class]/tr/td[class]").

Alternatively, in another embodiment, a signature for a given node is computed as a hash(path of parent Node)+hash (given node). Using such alternative approach, a signature of the td<class=cost>node 118 could be computed as, signature=signatureOfParent+hash("td[class]").

The alternative approach to computing a signature associated with a given node is computationally more efficient since it reuses signature information computed for a parent node of the given node, and therefore, obviates the need for duplicative processing of an entire path for every node along that path.

An objective is to assign the same signatures to nodes associated with substantially identical paths. For example, tr nodes 110 and 112 are assigned the same signature. Similarly nodes in DOMs of other documents (not shown) that are associated with substantially identical paths also are assigned the same signature.

The following is an example of the 'stack' for the computation of a signature for the td<class=cost>node 118 (referred to in the below process as the 'price' node).
Signature(price node)
=signature(parent of price node)+hash("td")+hash("class")
=signature(tr node)+hash("td")+hash("class")
=signature(parent of tr node)+hash("tr")+hash("td")+hash ("class")
=signature(parent of table[@class])+hash("table")+hash ("class")+hash("tr")+hash("td")+hash("class")
so on . . .

Persons of ordinary skill in the art will understand that a hash function can be any well-defined procedure or mathematical function for turning some kind of data into a relatively small integer, that can serve as an index into an array. Values returned by a hash function typically are called hash values, hash codes, hash sums, or simply hashes. The MD5hash function and the Jenkins hash function are two examples of computation schemes suitable for producing signatures in accordance with embodiments of the invention. However, other hash functions can be employed provided that structurally identical paths in one or more DOMs are associated with the same signatures, and structurally different paths in one or more DOMs are associated with different signatures.

Appendix A provides pseudo code for efficient computation of signatures in accordance with some embodiments of the invention.

Figure 2:
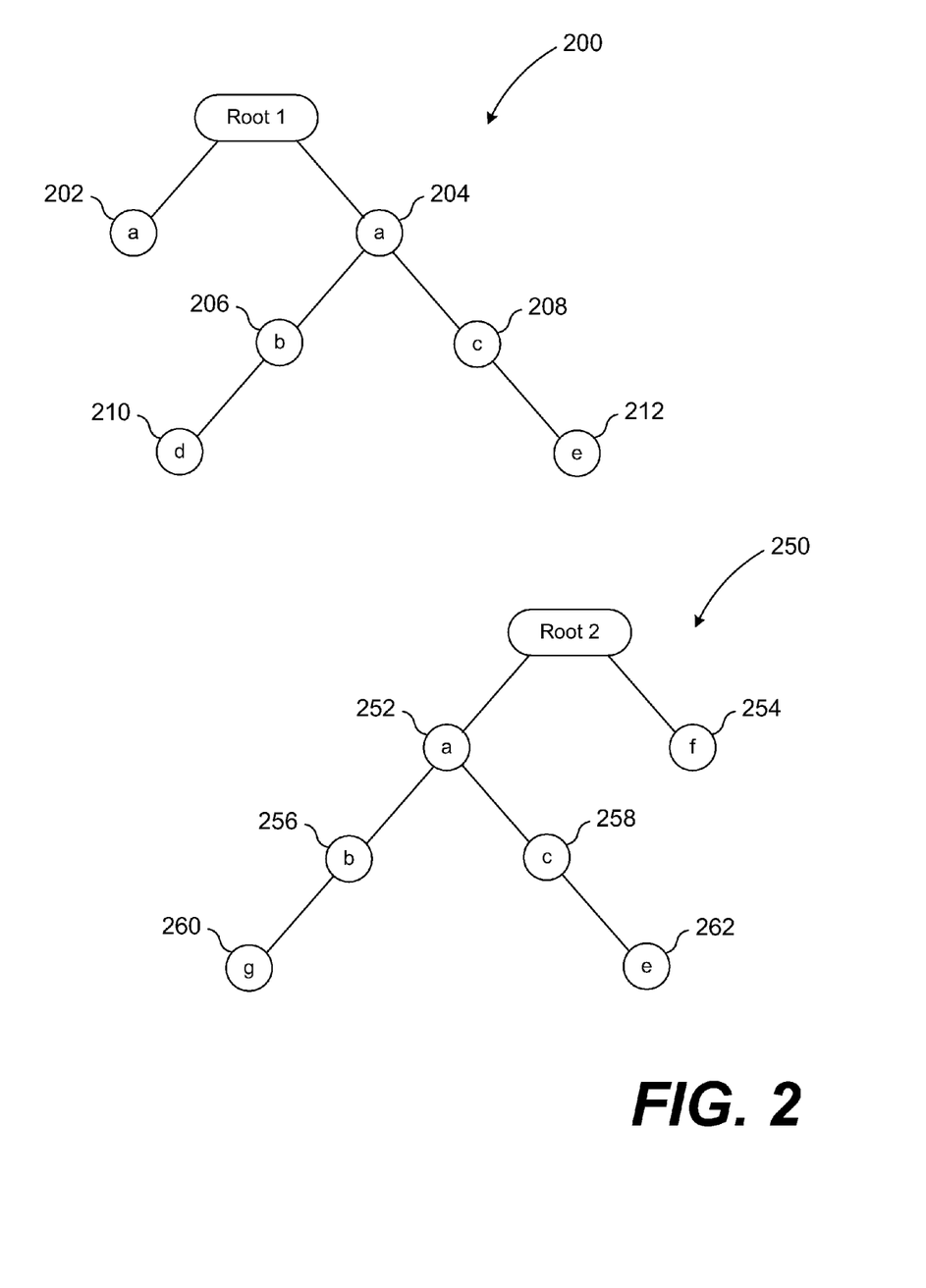
FIG. 2 is an illustrative drawing of two example DOMs corresponding to two web documents.

FIG. 2 is an illustrative drawing of two example DOMs 200, 250, corresponding to two web page documents. In accordance with some embodiments of the invention, signatures are computed for each node of each DOM 200, 250. As explained above, the signature associated with a given node of a given DOM is determined based upon the path from the root node of the given DOM to the given node. Simplified labels "a" through "g" are used to represent different nodes containing different information (e.g., element type or name type). Different hash values are produced for nodes containing different information and for nodes associated with different path structures from the root node.

TABLE 1 shows a hypothetical example of signatures computed for paths within the two example DOMs 200, 250.

TABLE 1 of Example Signatures for DOM1 and DOM2

| Signature | DOM 200 path(s) | DOM 250 path(s) |
| --- | --- | --- |
| S1 | Root1/202, Root1/204 | Root2/252 |
| S2 | Root1/204/206 | Root2/252/256 |
| S3 | Root1/204/208 | Root2/252/258 |
| S4 | Root/204/206/210 | None |
| S5 | Root1/204/208/212 | Root2/252/258/262 |
| S6 | None | Root2/254 |
| S7 | None | Root2/252/256/260 |

For example, row 1 of TABLE 1 indicates that the paths associated with nodes 202, 204 and 252 are substantially identical since nodes 202, 204 and 252 are associated with the same signature S1. Row 2 of TABLE 1 indicates that the paths associated with nodes 206 and 256 are substantially identical since nodes 206 and 256 are associated with the same signature S2. Row 4, for example, indicates that the path associated with node 210 is unique since only node 210 is associated with signature S4. Similarly, row 5 indicates that the path associated with node 254 is unique since only node 254 is associated with signature S5.

Indexing DOM Node Signatures to Document Identifiers

An index is produced in accordance with some embodiments of the invention that associates each of a multiplicity of signatures with nodes of one or more DOMs. In accordance with some embodiments of the invention, signatures are computed for every node of a DOM, and an index is produced in which each respective signature is associated with a respective pointer to a respective 'barrel' that contains document identifiers having respective DOMs that include one or more nodes associated with the signature. The term 'barrel' as used herein refers to a unit of storage in computer readable media that stores data having some common attribute. In the case of the index described herein, the term barrel refers to a store containing document identifiers (or DOM identifiers) that correspond to DOMs that have at least one node associated with the signature associated with such barrel. A pointer comprises a variable that contains the address of a location in computer readable memory. Pointers are used in some computer software embodiments of the invention to represent associations between signatures and the memory addresses of barrels containing document/DOM identifiers. The same document/DOM can be associated with multiple barrels, but each signature is associated with only one barrel.

In some embodiments of the invention, a webpage is first mapped to list of signatures generated from the webpage's DOM nodes as explained above (i.e., document id-->list of signatures), for example. Next, this 'index' is inverted to produce an inverted index that relates each signature to all webpages having DOMs containing one or more nodes associated with the signature (i.e. signature-->list of documents). This enables fast lookup of all documents that have the annotated nodes in them.

TABLE 2 below represents an index structure in which each signature is associated with every DOM (and its corresponding document) in which the signature is associated with a node. The index may be encoded in computer readable media in accordance with some embodiments of the invention. In other words, each signature is associated through a corresponding identifier, with each document (or DOM) that contains a node associated with a path from which the signature was computed. Since the same path structure in different DOMs results in identical signatures, the same signature can be associated with multiple DOMs (or documents). Thus, signatures within the index provide indicia of DOM path structures. In general, the more signatures that any two given DOMs share, the greater will be their structural similarity. The index can be referred to as an 'inverted' index since it relates signatures to all documents/DOMs containing one or more nodes associated with the signature.

TABLE 2

Inverted Index of Signatures to DOMs

| Signature | Barrel of Document Identifiers |
| --- | --- |
| S1 | DOM 200, DOM 250 |
| S2 | DOM 200, DOM 250 |
| S3 | DOM 200, DOM 250 |
| S4 | DOM 200 |
| S5 | DOM 200, DOM 250 |
| S6 | DOM 250 |
| S7 | DOM 250 |

Each row within the column labeled "Barrel of Document Identifiers" represents a different 'barrel'. For example, signature S1 is associated with a barrel that includes identifiers for DOM 200 and DOM 250. Signature S2 is associated with a barrel that includes identifiers for DOM 200 and DOM 250. Signature S4 is associated with a barrel that includes an identifier only for DOM 200, and signature S6 is associated with a barrel that includes an identifier only for DOM 250. It will be appreciated that DOM 200 and DOM 250 are simplified examples of DOMs that may be associated with a web pages. Likewise, TABLE 2 is a simplified example of an inverted index. Creation of such an index may involve crawling the web to identify a large number of web pages and computing signatures associated with the nodes of the DOMs of such identified web pages. Accordingly, an inverted index may contain an extremely large number of signatures and corresponding barrels.

Annotation of DOM Nodes

Figure 3:
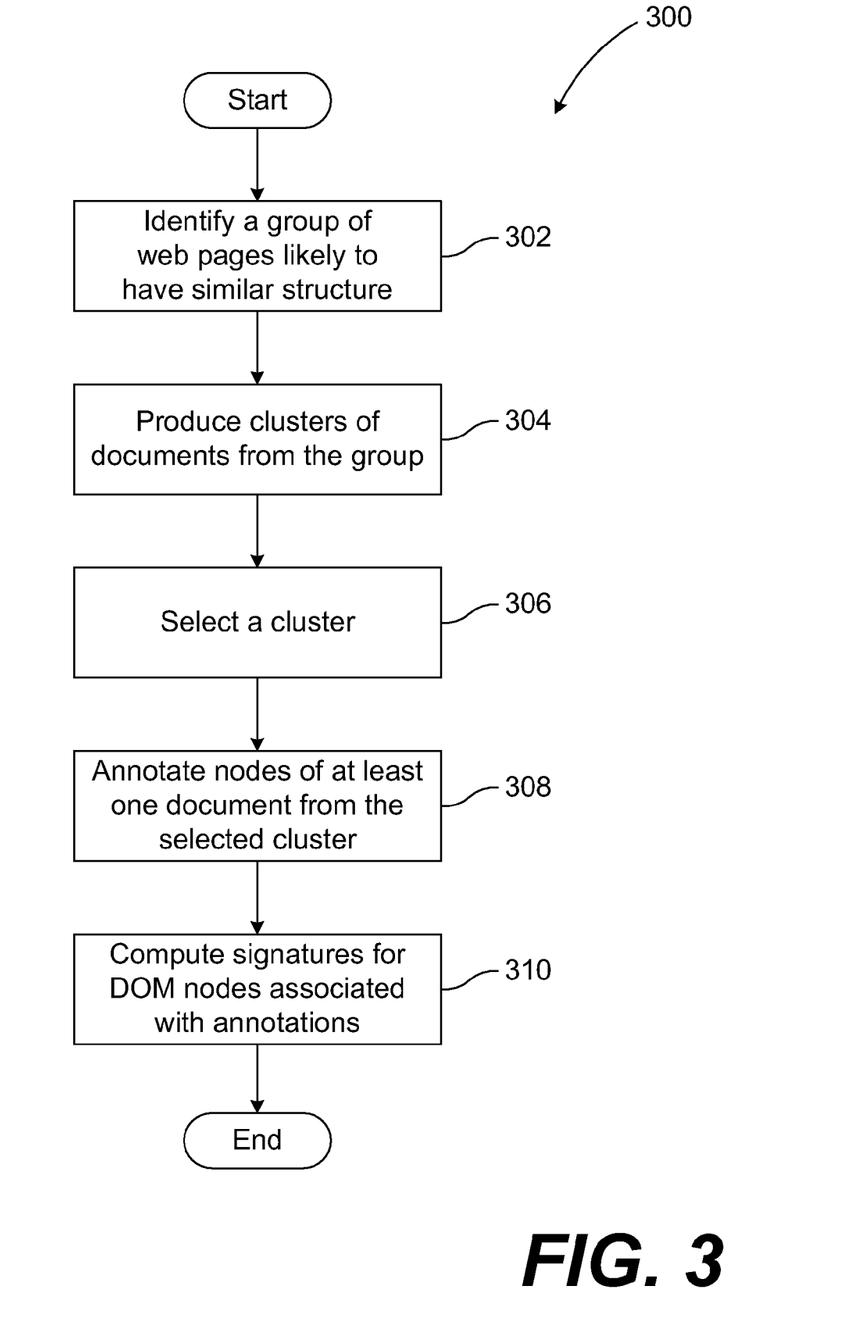
FIG. 3 is an illustrative flow diagram of a process to annotate nodes of DOMs in accordance with some embodiments of the invention.

FIG. 3 is an illustrative flow diagram of a process 300 to annotate nodes of DOMs in accordance with some embodiments of the invention. The process 300 can be implemented using a computer program encoded in a computer readable medium such as electronic storage or magnetic storage, for example. A large group of web pages may be similarly structured such that different pages display similar information in substantially the same way. For example, an e-commerce domain may provide a web site that includes a large number of web pages, perhaps thousands of web pages.

For instance, such e-commerce domain may serve as an online merchant that offers a wide range of products and services, and information to be extracted may include a "title" that is descriptive of a product or service, an "image" that portrays the product or service, and a "price" associated with the product or service. Alternatively, for example, such e-commerce domain may serve as an online ticket sales site, and the information to be extracted may include an event name, a location and a date of event. Another example e-commerce domain may serve as a source of online videos, and the information to be extracted may include a video title, an author name and an upload date. Yet another example e-commerce domain may include consumer reviews, and the information to be extracted may be the consumer reviews by category. The group of web pages provided by such e-commerce site, whether it be a product merchant site, a ticket sales site, an online video site or a review site, are likely to be similarly structured so as to present the information that is to be extracted in substantially the same positions on just about every web page. This consistency in presentation can facilitate ease of use by potential visitors to the site (i.e., potential customers), which may encourage exploration of additional web pages by such visitors, for example.

In block 302, a group of documents (e.g., web pages) is identified that are likely to have a similar structure. For example, the group may comprise web pages associated with the domain name or a website of a particular online merchant. As explained above, online merchants, for example, often use scripts and templates to produce and manage groups of web pages that are semi-structured so as to have a substantially uniform appearance. The term 'semi-structured' is used to signify that many web pages of the group present similar information in the same relative positions even though the web pages are not identical in appearance in that some may contain ads or discount prices, while others do not, for example. Semi-structured web pages typically possess DOMs having similar tree structures. Thus, most web documents of the identified group, when rendered by a browser, display like information that is deemed important, in substantially the same relative positions. Thus, for example, if the majority of the pages of the group contain important title, image and price information, then that information typically would be presented in substantially the same relative positions in just about every rendered web page.

Although the majority of web pages of the group initially identified based upon the domain of a particular online merchant may be likely to include useful information, it is also likely that some number of the pages in the initially identified group is likely to contain little or no useful information. By useful information, it is meant the type of information that is to be annotated for extraction such as product 'title', 'image' and 'price'. For example, the annotator may be annotating pages to extract comparative price information, and an online merchant's web pages may include 'product' pages that include product identifier and pricing information as well as 'review' pages and 'help' pages that do not include product identifier and pricing information.

A clustering process divides web documents from the identified group into different clusters based upon documents' structural similarity such as similarity of their DOM structures. The role of such clustering is to segregate one or more clusters of documents that are likely to include information to be extracted from one or more clusters of documents that are not likely to include information to be extracted. One or more representative documents from the former clusters are annotated, but documents from the latter clusters are not annotated.

Referring again to FIG. 3, in block 304, multiple clusters of web documents are assembled from the identified group of documents. In some embodiments, web documents are clustered together based upon similarity of their DOM structures. Specifically, for instance, documents may clustered based at least in part upon the number and position of tags within the documents' DOMs. Some but not necessarily all web pages of an identified group have similar DOM structures. For example, the group may include non-product/service pages such as "help" pages or "registration" pages. The clustering of similarly structured pages has the effect of separating such non-product/service pages from the product/service pages. Commonly owned U.S. patent application Ser. No. 11/838, 351, filed Aug. 14, 2007, entitled, "A Method For Organizing Structurally Similar Web Pages From A Web Site", invented by K. P. Chitrapura and K. L. Poola, which is expressly incorporated herein by this reference, describes a technique to cluster web pages based upon structural similarity.

For example, the initial clustering of block 304 might result in the following six clusters:

cluster 1: review pages
cluster 2: Product pages with ads
cluster 3: Product pages without ads
cluster 4: Product pages with recommendations for other products
cluster 5: Home pages (e.g.: gadgets main page, books main page, etc.)
cluster 6: Help pages or a few product manual pages In block 306, one or more clusters are selected for an annotation. Since there are likely to be far fewer non-product/service pages than there are product/service pages, block 306 selects one or more of the larger clusters to ensure that an actual product/service page is selected for annotation. For example, in the above clusters, there are likely to be a large number of web pages in each of clusters 2, 3 and 4, which are the clusters most likely to include information to be extracted, assuming for example, that product information such as product 'title', 'image' and 'price' is to be extracted. Clusters 5 and 6 are not likely to include information to be extracted, but there are likely to be relatively few pages in each of these clusters. Thus, one or more of the larger clusters 2-4 is more likely to be selected for an annotation than either of clusters 5-6.

In block 308, a person annotates nodes of a web page selected in block 306. Annotation may involve entering label information such as product "title", "image" and "price" and associating that label information (i.e., the annotations) with nodes of the selected page. Having a person perform the annotation rather than performing annotations in an automated manner ensures that human perception, judgment and intuition are applied during the annotation process. For example, considering the six sample clusters set forth above, cluster 1 is likely to contain a large number of web pages. Thus, block 304 might select any one or more of clusters 1-4 for annotation even though cluster 1 is not likely to include information to be extracted. In accordance with some embodiments of the invention, an actual person is involved in the annotation process to exercise human judgment in deciding whether or not to annotate one or more web documents from any given set of clusters such as clusters 1-4. It is assumed that a skilled annotator will readily perceive that the web documents of clusters 2-4 are of interest, but the web documents of cluster 1 are not.

During annotation, for example, an annotator may indicate a region (e.g., title, image or price field) of a rendered image of the selected web page with a pointer device such as a mouse and cursor. The region corresponds a node of the web page's DOM. In response to the annotator's indicating a region of the page, a pop-up window may be displayed in which the annotator enters label information such as "title", "image" or "price" as appropriate. An association between the annotation and a DOM node corresponding to a region of the web page indicated by the annotator is automatically stored in a computer readable medium.

In block 310, signatures are computed for the DOM nodes associated with the annotations.

Figure 4:
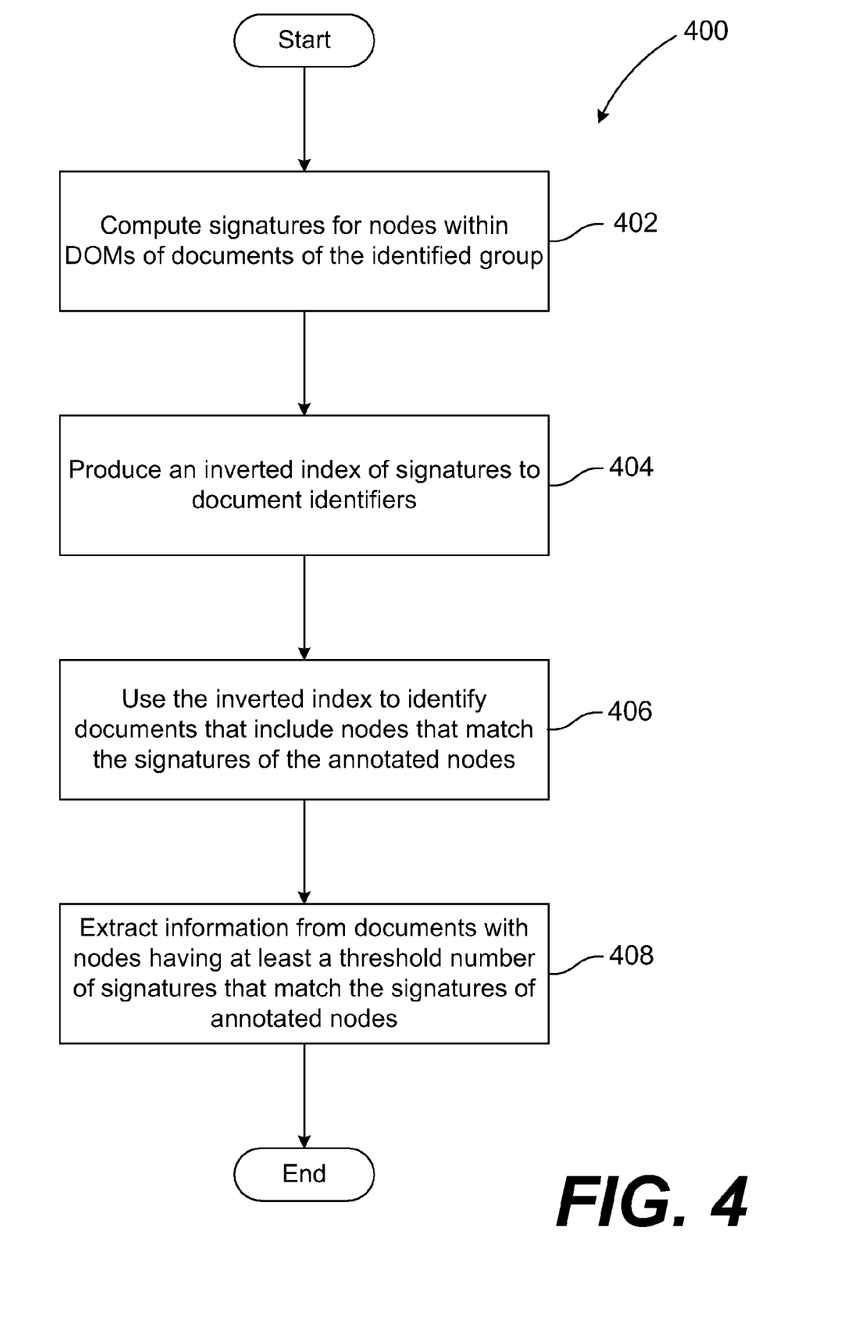
FIG. 4 is an illustrative flow diagram of a process to extract information from documents annotated in accordance with the process of FIG. 3.

FIG. 4 is an illustrative flow diagram of a process 400 to extract information from web documents annotated in accordance with some embodiments of the invention. In block 402, signatures are computed for nodes within DOMs of documents of the identified group. As explained above, the identified group may comprise web pages associated with a particular domain or an e-commerce site, for example. Referring again to FIG. 2, DOM 200 and DOM 250 may correspond to two documents of the identified group. Such a group may comprise web pages associated with a web site that includes thousands or perhaps millions of web pages and corresponding DOMs. DOMs 200, 250 are just a few examples. Signatures are computed for DOM nodes of web pages within the identified group as described above with reference to TABLE 1.

In block 404, an inverted index is produced in computer readable medium in which each node signature is associated with identifiers of documents/DOMs containing one or more nodes associated with the signature. TABLE 2 is a simplified example of such inverted index created for DOMs 200, 250 of FIG. 2. Since a DOM node signature is computed based upon a path structure associated with a node within a DOM, and since DOMs enjoy the property of isomorphism, an identical signature associated with two or more different nodes is indicative of such nodes being associated with substantially identical paths within one or more DOMs. Thus, the inverted index provides a convenient mechanism to group together documents/DOMs that have nodes associated with identical paths.

Block 406 uses the inverted index to identify documents/DOMs that include nodes having signatures that match signatures of nodes annotated in block 308 of FIG. 3. For example, referring to TABLE 2, assume that the annotator annotated nodes of a selected document that have signatures S5, S6 and S7. In that case, both DOM 200 and DOM 250 contain nodes that have signatures that match signature S5, but only DOM 250 has nodes that have signatures that match signatures S6 and S7. Thus, the document associated with DOM 250 is likely to have more information that is of interest than is the document associated with DOM 200.

In block 408, information is extracted from documents having DOM nodes that match a threshold number of signatures of annotated nodes. In some embodiments the threshold requirement is that a document (i.e. its DOM) include all signatures (e.g., for title, image and price) in order to qualify as a match. However, a different threshold requirement such as three out of four signatures, for example, may be used to test for matching. It will be appreciated that the threshold number of signatures ensures that pages are selected for information extraction (IE) that are most likely to contain the desired information.

Continuing with the example above in which six clusters are identified, the inverted index may contain signatures from each of the clusters 1-6. Annotation of one or more web pages from just one of the product clusters containing information desired for IE, (i.e., one of product clusters 2-4) may result in production of signatures that are associated with a threshold number of nodes of DOMs of one or more web pages in each of the product clusters from which IE is desired. In other words, the DOMs of all product clusters may be sufficiently structurally similar due to similarity of 'look and feel' for example, that signatures arising from annotations of a web page of one cluster apply to all clusters having sought-after information. Thus, fewer annotations may be required to achieve the desired level of IE despite relatively minor differences in the DOMs of different clusters. It will be appreciated of course that one or more web pages of more than one of the multiple product clusters may be annotated.

In some embodiments, extraction involves producing a wrapper (e.g., a regular expression tree) for the annotated page. When a structurally similar page from one of the clusters is presented for IE, the wrapper is used to extract information from the identified page as described in U.S. patent application Ser. No. 11/938,736, which is (again) incorporated herein by this reference. Referring to TABLE 1, for example, and assuming that the threshold number is three, information associated with nodes 262, 254 and 260 associated with DOM 250 is extracted since these nodes correspond to signatures, S5, S6 and S7, respectively. However, no information is extracted from any node associated with DOM 200 since only a single node of DOM 200 has a signature that matches a signature of an annotated node.

Figure 5:
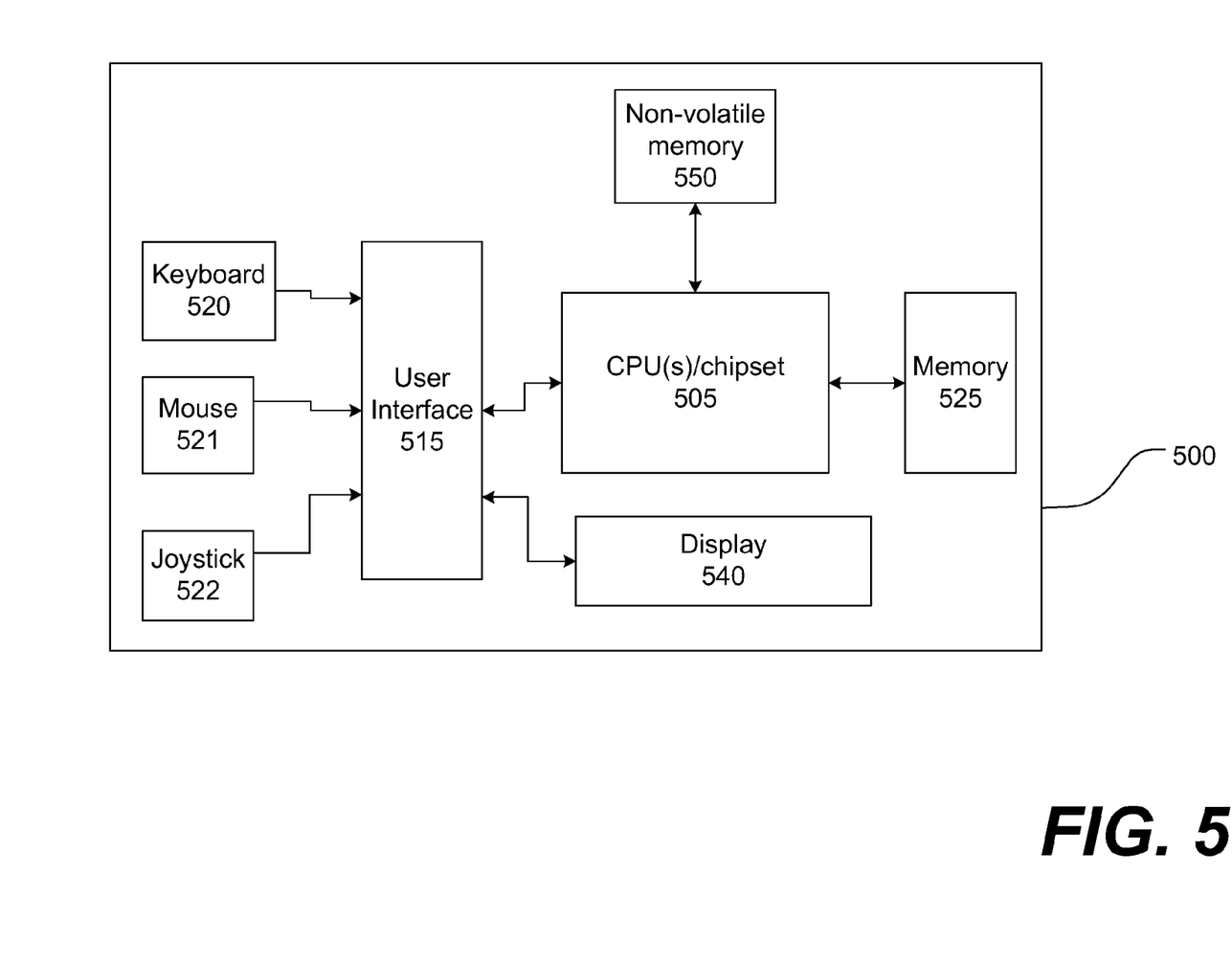
FIG. 5 is an illustrative drawing showing components of a computer system that can be programmed to perform processes of FIGS. 3-4 in accordance with embodiments of the invention.

FIG. 5 is an illustrative drawing showing components of a computer system 500 that can be programmed to perform processes in accordance with embodiments of the invention. Such a computer system can include a keyboard 520, mouse 521, joystick 522 as examples of user input devices that provide input to user interface 515. User interface 515 communicates with CPUs/chipset 505 which provide processing functionality and can receive data from nonvolatile memory 550 which can include a solid-state or a magnetic disk drive for example. User interface 515 also can communicate with a display 540. Working memory 525, such as DRAM, also can be used by CPU 505 to store information currently being used.

Figure 6:
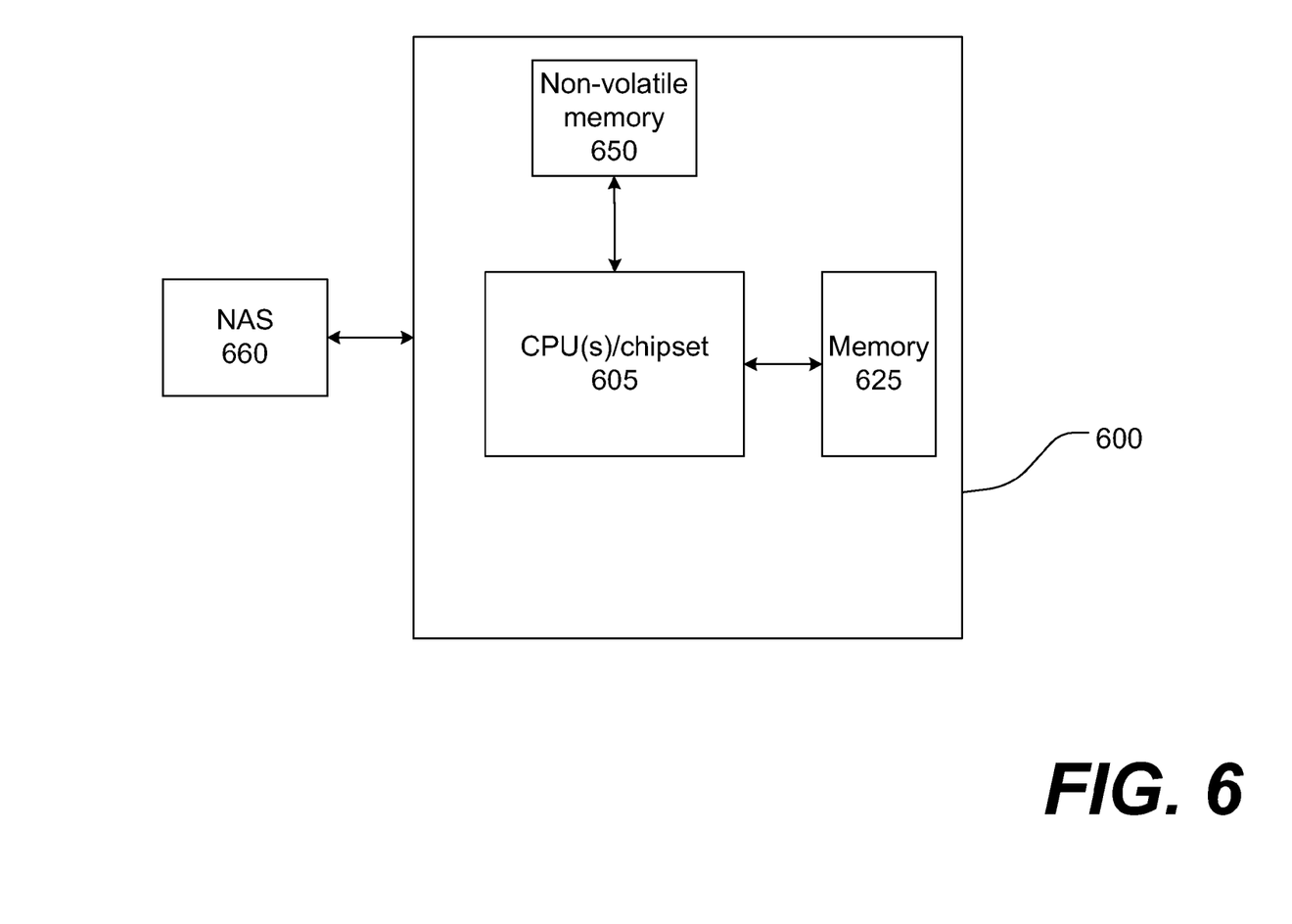
FIG. 6 illustrates a computer that may be used alone or in combination with other computers for hosting processes illustrated in FIGS. 3-4 in accordance with embodiments of the invention.

FIG. 6 illustrates a computer 600 that may be used alone or in combination with other computers for hosting processes illustrated in FIGS. 3-4, for example. Computer 600 also may comprise one or more CPUs and a chipset collectively labeled 605, which may communicate with a main memory 625, as well as with a nonvolatile memory 650 other memory or storage available to computer 601 includes Network Attached Storage (NAS) 660. The processes illustrated in FIGS. 3-4 can be implemented in one or more computers 600, or as threads in such computers. Code for these processes can be stored in computer readable media, such as solid-state drives, hard drives, CD-ROMs and other optical storage means, transiently in nonvolatile memories as well as embodied in communication signals. Computer programs comprise, for example, instructions and data, which cause or otherwise configure a general purpose computer, special purpose computer, or special purpose processing device to perform a certain function or group of functions.

The foregoing description and drawings of preferred embodiments in accordance with the present invention are merely illustrative of the principles of the invention. Various modifications can be made to the embodiments by those skilled in the art without departing from the spirit and scope of the invention. Therefore, the scope of the invention is not intended to be limited only to the disclosed embodiments but rather, is defined in the appended claims.

APPENDIX A

Pseudo Code to Compute Signatures

```
call computeFingerPrints(document.root,0)
computeFingerPrints(node,fingerPrintOfParent){
    myFingerPrint = fingerPrintOfParent + hash(node.Name)
    myFingerPrint += hash(node.attributeNames);
    foreach(childNode in node.children){
        if(childsNode.type==ELEMENT_NODE)
            computeFingerPrint(childNode,myFingerPrint);
    }
}
You can drop this line: if(childsNode.type==ELEMENT_NODE). Its too much detail. We can simply it to
call computeFingerPrints(document.root,0)
computeFingerPrints(node,fingerPrintOfParent){
    myFingerPrint = fingerPrintOfParent + hash(node)
    foreach(childNode in node.children){
        computeFingerPrint(childNode,myFingerPrint);
    }
}
hash(node){
    hash(node.name)+hash(attribute names);
}
```

The invention claimed is:

1. a method for information extraction from among a multiplicity of documents each having a corresponding document object model (DOM) comprising:
   computing a plurality of signatures for a plurality of nodes of one or more DOMs that are associated with documents of the multiplicity of documents;
   wherein each particular signature of the plurality of signatures represents a different path of a node within at least one of the one or more DOMs;
   producing an inverted index that associates each particular signature of the plurality of signatures to an identifier of each document that has a DOM that has one or more nodes corresponding to the particular signature;
   selecting at least one document from the multiplicity of documents;
   annotating a set of one or more nodes of a DOM that is associated with the at least one selected document;
   wherein the set of one or more nodes have one or more signatures that match one or more respective signatures of the plurality of signatures included in the inverted index; and
   matching the one or more signatures of the set of one or more nodes with the one or more respective signatures of the plurality of signatures in the inverted index to determine a set of documents, from the multiplicity of documents, that have one or more DOM nodes that correspond to the set of one or more nodes;
   wherein the set of documents includes at least one document that is different than the selected at least one document;
   wherein at least the steps of computing, producing, and matching are performed by one or more computing devices.

2. The method of claim 1,
   wherein the one or more DOMs correspond to respective HTML documents.

3. The method of claim 1,
   wherein the one or more DOMs correspond to respective XML documents.

4. The method of claim 1 further including:
   computing one or more signatures that respectively correspond to the set of one or more nodes.

5. The method of claim 1 further including:
   producing multiple respective clusters of documents from among the multiplicity of documents;
   wherein selecting at least one document from the multiplicity of documents includes selecting the at least one document from a cluster of documents.

6. The method of claim 1 further including:
   identifying documents from the multiplicity of documents that have DOMs that are structurally similar;
   producing multiple respective clusters of documents in which respective clusters contain documents identified as having structurally similar DOMs;
   wherein selecting at least one document from the multiplicity of documents includes selecting the at least one document from a cluster of documents.

7. The method of claim 1 further including:
   identifying documents from the multiplicity of documents that have DOMs that are structurally similar;
   producing multiple respective clusters of documents in which respective clusters contain documents identified as having structurally similar DOMs;
   selecting a cluster from which to select the at least one document based at least in part upon a cluster size of the selected cluster.

8. The method of claim 1,
   wherein matching includes matching to respectively determine which documents from the multiplicity of documents have at least a threshold number of DOM nodes that correspond to the set of one or more nodes.

9. The method of claim 8 further including:
   extracting information from documents determined to have at least the threshold number of DOM nodes that correspond to the set of one or more nodes.

10. The method of claim 1,
    wherein matching includes matching to respectively determine which documents from the multiplicity of documents have at least a threshold number of DOM nodes that correspond to the set of one or more nodes; and further including:
    producing a regular expression tree for the at least one annotated document; and
    using the regular expression tree to extract information from documents determined to have at least the threshold number of DOM nodes that correspond to the set of one or more nodes.

11. The method of claim 1,
    wherein computing the plurality of signatures includes computing signatures associated with DOM nodes of every respective document of the multiplicity of documents.

12. The method of claim 1,
    wherein computing the plurality of signatures includes computing respective hashes of DOM node tree paths that correspond to nodes of the multiplicity of respective DOMs.

13. The method of claim 1 further including:
    computing one or more signatures that respectively correspond to the set of one or more nodes;
    wherein computing the one or more signatures that respectively correspond to the set of one or more nodes includes computing respective hashes of DOM node tree paths that correspond to the set of one or more nodes.

14. The method of claim 1 wherein computing the plurality of signatures includes computing respective hashes of DOM node tree paths that correspond to nodes of the multiplicity of respective DOMs; further including:
computing one or more signatures that respectively correspond to the set of one or more nodes;
wherein computing the one or more signatures that respectively correspond to the one or more annotated nodes includes computing respective hashes of DOM node tree paths that correspond to the set of one or more nodes.

15. A non-transitory computer readable storage medium encoded with program code to cause a computer system to perform a process for information extraction from among a multiplicity of documents each having a corresponding document object model (DOM) comprising:
computing a plurality of signatures for a plurality of nodes of one or more DOMs that are associated with documents of the multiplicity of documents;
wherein each particular signature of the plurality of signatures represents a different path of a node within at least one of the one or more DOMs;
producing an inverted index that associates each particular signature of the plurality of signatures to an identifier of each document that has a DOM that has one or more nodes corresponding to the particular signature;
selecting at least one document from the multiplicity of documents;
annotating a set of one or more nodes of a DOM that is associated with the at least one selected document;
wherein the set of one or more nodes have one or more signatures that match one or more respective signatures of the plurality of signatures included in the inverted index; and
matching the one or more signatures of the set of one or more nodes with the one or more respective signatures of the plurality of signatures in the inverted index to determine a set of documents, from the multiplicity of documents, that have one or more DOM nodes that correspond to the set of one or more nodes;
wherein the set of documents includes at least one document that is different than the selected at least one document.

16. The non-transitory computer-readable storage medium of claim 15 further including instructions for:
producing multiple respective clusters of documents from among the multiplicity of documents;
wherein selecting at least one document from the multiplicity of documents includes selecting the at least one document from a cluster of documents.

17. The non-transitory computer-readable storage medium of claim 15 further including instructions for:
identifying documents from the multiplicity of documents that have DOMs that are structurally similar;
producing multiple respective clusters of documents in which respective clusters contain documents identified as having structurally similar DOMs;

wherein selecting at least one document from the multiplicity of documents includes selecting the at least one document from a cluster of documents.

18. The non-transitory computer-readable storage medium of claim 15 further including instructions for:
identifying documents from the multiplicity of documents that have DOMs that are structurally similar;
producing multiple respective clusters of documents in which respective clusters contain documents identified as having structurally similar DOMs;
selecting a cluster from which to select the at least one document based at least in part upon a cluster size of the selected cluster.

19. The non-transitory computer-readable storage medium of claim 15,
wherein matching includes matching to respectively determine which documents from the multiplicity of documents have at least a threshold number of DOM nodes that correspond to the set of one or more nodes.

20. A method for information extraction from among a multiplicity of documents each having a corresponding document object model (DOM) comprising:
generating a plurality of signatures for a plurality of nodes of one or more DOMs that are associated with documents of the multiplicity of documents;
wherein the plurality of signatures comprises a first signature that represents a first path for a node of at least one of the one or more DOMs;
wherein the plurality of signatures comprises a second signature that represents a second path for a node of at least one of the one or more DOMS;
wherein the first path is different than the second path;
producing an inverted index that associates the first signature to an identifier of each document, of the multiplicity of documents, that has a DOM that has a node with the first path and associates the second signature to an identifier of each document, of the multiplicity of documents, that has a DOM that has a node with the second path;
receiving annotations for a set of one or more nodes of a DOM that is associated with at least one selected document;
wherein each node of the set of one or more nodes has a particular signature that matches a corresponding signature of the plurality of signatures included in the inverted index; and
matching the particular signature of the each node of the set of one or more nodes with the corresponding signatures in the inverted index to determine a set of documents, from the multiplicity of documents, that have one or more DOM nodes that correspond to the set of one or more nodes;
wherein the set of documents includes at least one document that is different than the selected at least one document;
wherein the method is performed by one or more computing devices.

* * * * *